US012327900B2

(12) United States Patent
Wu et al.

(10) Patent No.: US 12,327,900 B2
(45) Date of Patent: Jun. 10, 2025

(54) PHASE SHIFTER AND PREPARATION METHOD THEREOF, PHASED ARRAY ANTENNA

(71) Applicants: Beijing BOE Technology Development Co., Ltd., Beijing (CN); BOE Technology Group Co., Ltd., Beijing (CN)

(72) Inventors: Qianhong Wu, Beijing (CN); Jingwen Guo, Beijing (CN); Chunxin Li, Beijing (CN); Junwei Guo, Beijing (CN); Jia Fang, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/915,509

(22) PCT Filed: Dec. 27, 2021

(86) PCT No.: PCT/CN2021/141663
§ 371 (c)(1),
(2) Date: Sep. 29, 2022

(87) PCT Pub. No.: WO2023/122887
PCT Pub. Date: Jul. 6, 2023

(65) Prior Publication Data
US 2024/0243456 A1 Jul. 18, 2024

(51) Int. Cl.
*H01P 1/18* (2006.01)
*H01P 1/12* (2006.01)
(Continued)

(52) U.S. Cl.
CPC .............. *H01P 1/182* (2013.01); *H01P 1/127* (2013.01); *H01P 3/026* (2013.01); *H01Q 3/38* (2013.01)

(58) Field of Classification Search
CPC .......... H01P 1/182; H01P 1/127; H01P 3/026; H01P 1/18; H01Q 3/38; H01Q 3/36
(Continued)

(56) References Cited

U.S. PATENT DOCUMENTS 7,259,641 B1 * 8/2007 Weller .................... H01P 1/184 333/156
7,583,169 B1 * 9/2009 Scardelletti ............. H01P 1/127 333/262
(Continued)

FOREIGN PATENT DOCUMENTS

CN 1380245 A 11/2002
CN 2657214 Y 11/2004
(Continued)

*Primary Examiner* — Jorge L Salazar, Jr.
(74) *Attorney, Agent, or Firm* — Ling Wu; Stephen Yang; Ling and Yang Intellectual Property

(57) ABSTRACT

A phase shifter, a preparation method thereof, and a phased array antenna. The phase shifter includes a substrate (5); two ground lines (1) located on the substrate (5); a signal line (2) located on the substrate (5) and between two ground lines (1), wherein there is a spacing between the signal line (2) and the ground line (1); a dielectric layer (3) located at a side of the signal line (2) and the ground lines (1) away from the substrate (5); at least one bridge (8) located at a side of the dielectric layer (3) away from the substrate (5), projections of the ground lines (1) and the signal line (2) on the substrate (5) are overlapped with a projection of the bridge (8) on the substrate (5), and there is a spacing between the bridge (8) and the dielectric layer (3).

15 Claims, 9 Drawing Sheets

(51) Int. Cl.
*H01P 3/02* (2006.01)
*H01Q 3/38* (2006.01)

(58) Field of Classification Search
USPC .................................................. 333/161, 186
See application file for complete search history.

(56) References Cited

U.S. PATENT DOCUMENTS

| | | | |
|---|---|---|---|
| 2004/0112723 | A1 | 6/2004 | Jung et al. |
| 2008/0272857 | A1 | 11/2008 | Singh |
| 2019/0372199 | A1 | 12/2019 | Haridas et al. |
| 2022/0311112 | A1 | 9/2022 | Wang et al. |

FOREIGN PATENT DOCUMENTS

| | | | |
|---|---|---|---|
| CN | 1851972 | A | 10/2006 |
| CN | 101143706 | A | 3/2008 |
| CN | 101159345 | A | 4/2008 |
| CN | 101246981 | A | 8/2008 |
| CN | 101276950 | A | 10/2008 |
| CN | 201540938 | U | 8/2010 |
| CN | 103746157 | A | 4/2014 |
| CN | 110661064 | A | 1/2020 |
| CN | 112332049 | A | 2/2021 |
| CN | 112787052 | A | 5/2021 |
| JP | 2003-298307 | A | 10/2003 |
| JP | 2008-131096 | A | 6/2008 |
| WO | 2009023551 | A1 | 2/2009 |

* cited by examiner

PHASE SHIFTER AND PREPARATION METHOD THEREOF, PHASED ARRAY ANTENNA

CROSS-REFERENCE TO RELATED APPLICATION

The present application is a U.S. National Phase Entry of International Application No. PCT/CN2021/141663 having an international filing date of Dec. 27, 2021, the content of which is incorporated into this application by reference.

TECHNICAL FIELD

Embodiments of the present disclosure relate to, but are not limited to, the technology field of phase shifter, in particular to a phase shifter and a preparation method thereof, and a phased array antenna.

BACKGROUND

Phased array antenna is a mainstream satellite communication antenna, in which a phase shifter is a key element of the phased array antenna. Common phase shifters include a transmission line phase shifter, a variable capacitance phase shifter, a liquid crystal phase shifter, a ferroelectric phase shifter, and a Micro-Electro-Mechanical System (MEMS) phase shifter, etc. Herein, the MEMS phase shifter has a short response time (μs), a good temperature stability, a wide working bandwidth and other advantages, and gradually enters the field of vision of people.

SUMMARY

The following is a summary of subject matters described herein in detail. The summary is not intended to limit the protection scope of claims.

An embodiment of the present disclosure provides a phase shifter, including: a substrate; two ground lines located on the substrate; a signal line located on the substrate and between the two ground lines, wherein there is a spacing between the signal line and any one of the two ground lines; a dielectric layer located at a side of the signal line and the ground lines away from the substrate; at least one bridge located at a side of the dielectric layer away from the substrate, projections of the ground lines and the signal line on the substrate are overlapped with a projection of the bridge on the substrate, and there is a spacing between the bridge and the dielectric layer.

In an exemplary implementation, each of the at least one bridge includes two connecting portions, and a suspension beam portion disposed between the two connecting portions and connected with the connecting portions, wherein projections of the ground lines on the substrate are overlapped with projections of the connecting portions on the substrate, a projection of the signal line on the substrate is overlapped with a projection of the suspension beam portion on the substrate, the connecting portions are used for supporting the suspension beam portion so that the suspension beam portion is located at a side of the dielectric layer away from the substrate.

In an exemplary implementation, the number of the at least one bridge is multiple, and the multiple bridges are arranged at an interval along a second direction perpendicular to a first direction, and the first direction is parallel to a direction in which the ground line points to the signal line.

In an exemplary implementation, the number of bridges is $2^N$, where N is the number of bits of the phase shifter.

In an exemplary implementation, the phase shifter includes ($2^N$+1) coplanar waveguide (CPW) transmission line structures, wherein each of $2^N$ CPW transmission line structures includes one bridge, a ($2^N$+1)-th CPW transmission line structure is arranged at a side of the $2^N$ CPW transmission line structures along the first direction, the ($2^N$+1)-th CPW transmission line structure has no bridge and is configured to be connected with a signal line bias line, where N is the number of bits of the phase shifter.

In an exemplary implementation, a width of the ground lines along the first direction is 5 to 6 times a width of the signal line along the first direction.

In an exemplary implementation, the dielectric layer includes a first dielectric layer and a second dielectric layer located above the first dielectric layer, the signal line, and the ground lines.

The first dielectric layer is located in a spacing region between the signal line and the ground lines, and a projection of the first dielectric layer on the substrate is overlapped with a projection of the bridge on the substrate.

The second dielectric layer includes two first branches, a second branch disposed between the two first branches, and multiple third branches, wherein there is a spacing between any one of the two first branches and the second branch, the third branch is disposed between the first branch and the second branch, the third branch is connected with the first branch and the second branch respectively, projections of the two first branches on the substrate is at least partially overlapped with projections of the ground lines on the substrate, a projection of the signal line on the substrate is located within a projection of the second branch on the substrate, and a projection of the first dielectric layer on the substrate is at least partially overlapped with projections of the third branches on the substrate.

In an exemplary implementation, the projections of the ground lines on the substrate are located within the projections of the two first branches on the substrate; and the phase shifter further includes a lead electrode and a bridge bias line, wherein the bridge is connected with the lead electrode, and the lead electrode is connected with the bridge bias line to provide a first control voltage to the bridge through the bridge bias line.

In an exemplary implementation, the bridge includes multiple bridges, the multiple bridges is divided into multiple groups, each group includes at least one bridge, and the at least one bridge of each group is connected by the bridge bias line.

In an exemplary implementation, the number of the bridges in an i-th group is $2^{N_i}$, where i is an integer between 1 and N+1, $N_i$ is an integer between 0 and N−1, N is the number of bits of the phase shifter.

In an exemplary implementation, a projection of a first branch below the bridge on the substrate and a projection of the ground line on the substrate have a non-overlapped region; the bridge is connected with the ground line in the non-overlapped region to provide a first control voltage to the bridge through the ground line.

In an exemplary implementation, the dielectric layer includes two first branches, and a second branch disposed between the two first branches, wherein there is a spacing between any one of the two first branches and the second branch, projections of the two first branches on the substrate and projections of the ground lines on the substrate have an overlapped region, and a projection of the signal line on the substrate is located within the projection of the second branch on the substrate.

In an exemplary implementation, the projections of the ground lines on the substrate are located within the projections of the two first branches on the substrate; and the phase shifter further includes a lead electrode and a bridge bias line, wherein the bridge is connected with the lead electrode, and the lead electrode is connected with the bridge bias line to provide a first control voltage to the bridge through the bridge bias line.

In an exemplary implementation, a projection of a first branch below the bridge on the substrate and a projection of the ground line on the substrate have a non-overlapped region; the bridge is connected with the ground line in the non-overlapped region to provide a first control voltage to the bridge through the ground line.

In an exemplary implementation, the phase shifter further includes a signal line bias line located at a side of the bridge along a second direction or at a side of the phase shifter along a second direction, and the signal line is connected with the signal line bias line to provide a second control voltage to the signal line through the signal line bias line.

An embodiment of the present disclosure also provides a phased array antenna including the phase shifter as described above.

An embodiment of the present disclosure also provides a preparation method of a phase shifter, which includes: forming two ground lines and one signal line on a substrate, wherein the signal line is located between the two ground lines and there is a spacing between the signal line and any one of the two ground lines; forming a dielectric layer at a side of the signal line and the ground lines away from the substrate; forming at least one bridge at a side of the dielectric layer away from the substrate, wherein projections of the ground lines and the signal line on the substrate are overlapped with a projection of the bridge on the substrate, and there is a spacing between the bridge and the dielectric layer.

Other aspects may be comprehended upon drawings and detailed descriptions are read and understood.

BRIEF DESCRIPTION OF DRAWINGS

Accompanying drawings are used to provide further understanding of technical solutions of the present disclosure, constitute a part of the specification, and together with the embodiments of the present disclosure, are used to explain the technical solutions of the present disclosure, and do not constitute limitations on the technical solutions of the present disclosure. Shapes and sizes of various components in the drawings do not reflect actual scales, and are only intended to schematically illustrate contents of the present disclosure.

DETAILED DESCRIPTION

Figure 1:
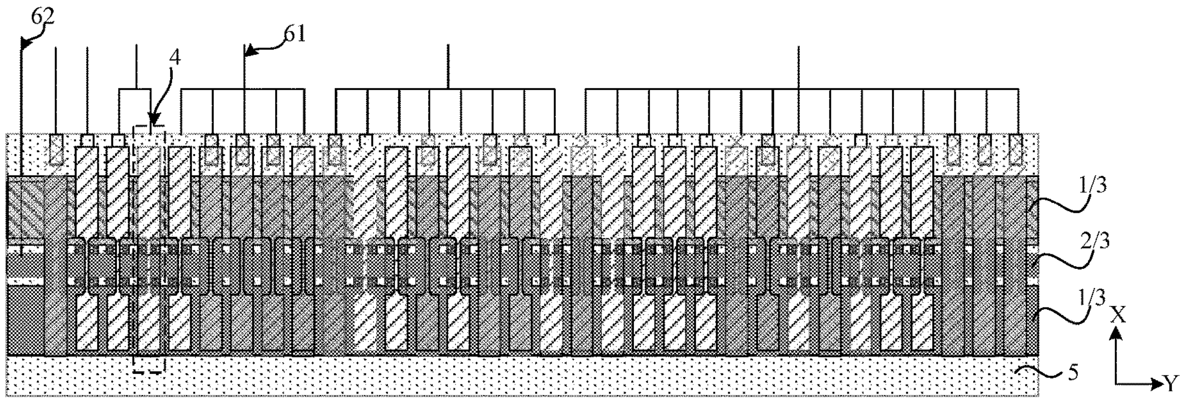
FIG. 1 is a schematic diagram of a structure of a phase shifter according to an embodiment of the present disclosure.

To make objectives, technical solutions, and advantages of the present disclosure clearer, the embodiments of the present disclosure will be described in detail below with reference to the accompanying drawings. It is to be noted that implementations may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other without a conflict.

In the drawings, a size of a constituent element, a thickness of a layer, or a region is exaggerated sometimes for clarity. Therefore, one implementation of the present disclosure is not necessarily limited to the size, and shapes and sizes of various components in the drawings do not reflect actual scales. In addition, the drawings schematically illustrate ideal examples, and one embodiment of the present disclosure is not limited to the shapes, numerical values, or the like shown in the drawings.

Ordinal numerals such as "first", "second", and "third" in the specification are set to avoid confusion of constituent elements, but are not set a limit in quantity.

In the specification, for convenience, wordings indicating directional or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a mentioned apparatus or element must have a particular orientation and be constructed and operated in the particular orientation. Therefore, they cannot be understood as limitations on the present disclosure. The positional relationships between the constituent elements may be changed as appropriate according to directions for describing the constituent elements. Therefore, appropriate replacements can be made according to situations without being limited to the wordings described in the specification.

In the specification, unless otherwise specified and defined explicitly, terms “mount”, “mutually connect”, and “connect” should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand specific meanings of these terms in the present disclosure according to specific situations.

In the specification, “electrical connection” includes a case in which constituent elements are connected together through an element with a certain electrical effect. The “element with the certain electrical effect” is not particularly limited as long as electrical signals may be sent and received between the connected constituent elements. Examples of the “element with the certain electrical effect” not only include electrodes and wirings, but also include switch elements (such as transistors), resistors, inductors, capacitors, other elements with various functions, etc.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

In the present disclosure, “about” refers to that a boundary is defined not so strictly and numerical values within process and measurement error ranges are allowed.

In the present disclosure, that two structures are “arranged in a same layer” means that the two structures are formed in the same material layer, so that they are in the same layer in a laminated relationship, but it does not mean that respective distances from them to the substrate are equal or that respective structures of other layers between them and the substrate are completely identical.

In the present disclosure, a “patterning process” refers to an act of forming a structure with a specific pattern, which may be a photolithography process including one or more of the acts of forming a material layer, coating a photoresist, exposing, developing, etching, stripping a photoresist, and the like. It is apparent that the “patterning process” may also be an imprint process, an inkjet printing process and other processes.

Figure 2A:
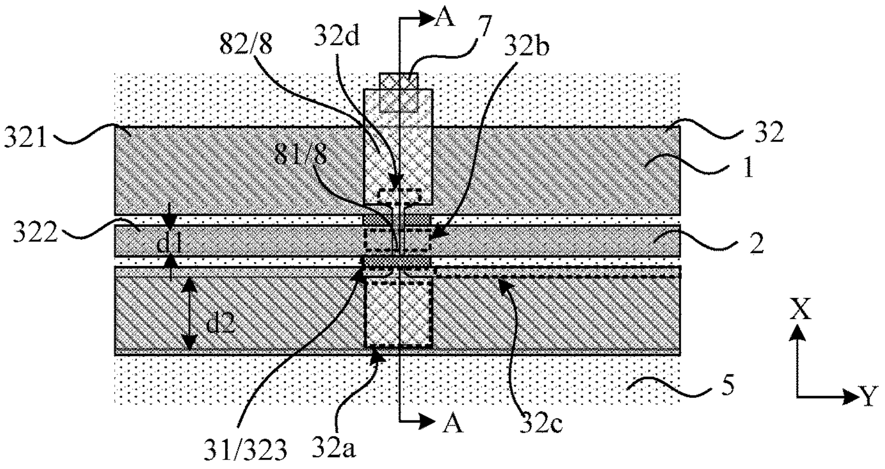
FIG. 2A is a schematic diagram of a structure of the single phase shift unit in FIG. 1.
Figure 2B:
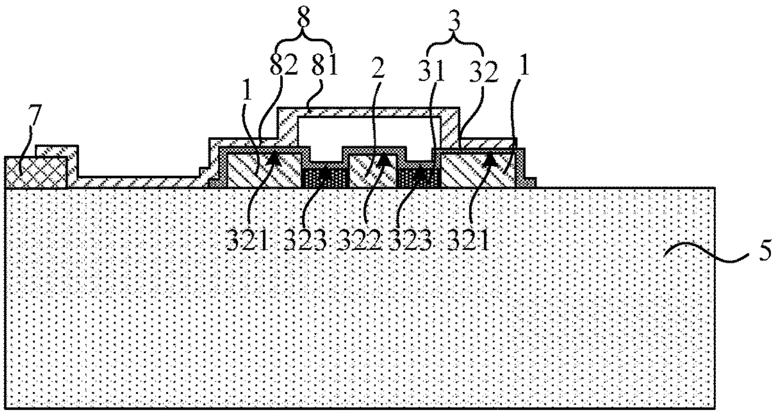
FIG. 2B is a sectional view of the single phase shift unit in FIG. 2A in an A-A direction.
Figure 3:
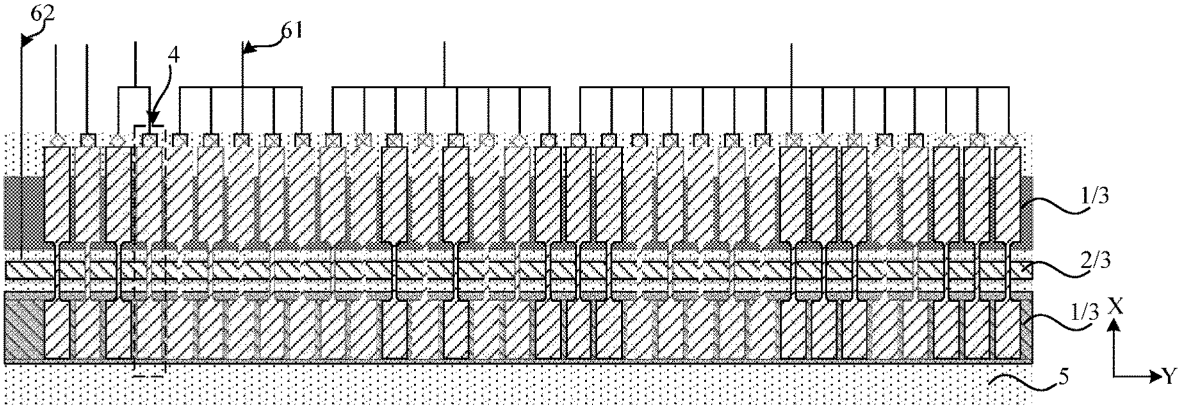
FIG. 3 is a schematic diagram of a structure of another phase shifter according to an embodiment of the present disclosure.
Figure 4A:
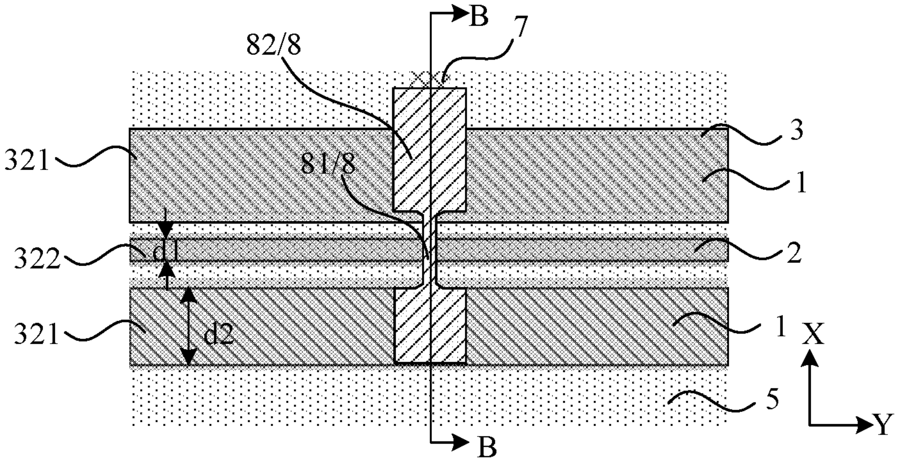
FIG. 4A is a schematic diagram of a structure of the single phase shift unit in FIG. 3.
Figure 4B:
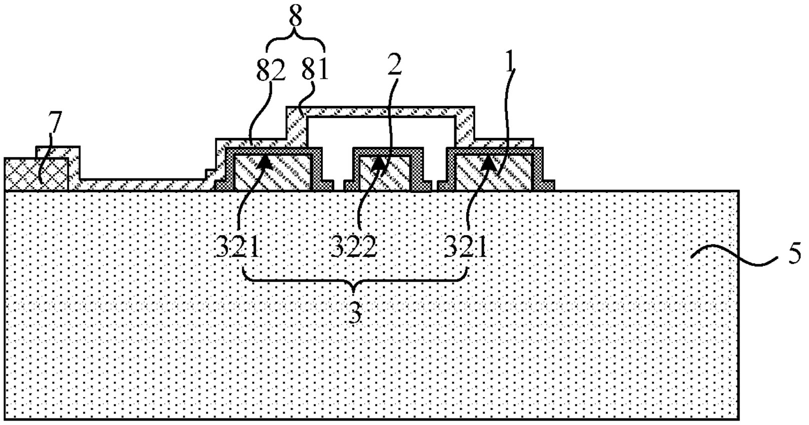
FIG. 4B is a sectional view of the single phase shift unit in FIG. 4A in a B-B direction.

FIG. 1 and FIG. 3 are structures of two phase shifters provided by the embodiment of the present disclosure. FIG. 2A is a schematic diagram of a structure of the single phase shift unit 4 in FIG. 1, and FIG. 2B is a cross-sectional view of the single phase shift unit in FIG. 2A in A-A direction. FIG. 4A is a schematic diagram of a structure of the single phase shift unit 4 in FIG. 3, and FIG. 4B is a sectional view of the single phase shift unit in FIG. 4A in B-B direction. As shown in FIG. 1, FIG. 2A, FIG. 2B, FIG. 3, FIG. 4A and FIG. 4B, an embodiment of the present disclosure provides a phase shifter, including: a substrate 5; two ground lines 1 located on the substrate 5; a signal line 2 located on the substrate 5 and between two ground lines 1, wherein there is a spacing between the signal line 2 and the ground line 1; a dielectric layer 3 located at a side of the signal line 2 and the ground lines 1 away from the substrate 5; at least one bridge 8 located at a side of the dielectric layer 3 away from the substrate 5, wherein projections of the ground lines 1 and the signal line 2 on the substrate 5 are overlapped with a projection of the bridge 8 on the substrate 5, and there is a spacing between the bridge 8 and the dielectric layer 3.

Optionally, the phase shifter according to an embodiment of the present disclosure may be a Micro-Electro-Mechanical System (MEMS) phase shifter.

An embodiment of the present disclosure provides a novel phase shifter structure, of which the working principle is that: two ground lines 1 and a signal line 2 constitute a coplanar waveguide (CPW) transmission line, the bridge 8 is in a suspended state when there is no voltage difference between the bridge 8 and the signal line 2, and the bridge 8 will be pulled down to a surface of the dielectric layer 3 under an action of electrostatic force when a sufficiently large DC voltage is applied between the bridge 8 and the signal line 2, and the capacitance will change, resulting in a change of electromagnetic wave transmission properties, thus realizing the phase shift.

In an embodiment of the present disclosure, the phase shift unit 4 of the phase shifter is an MEMS bridge, and a single phase shift unit 4 includes a substrate 5, a CPW transmission line (including two ground lines 1 and a signal line 2), a dielectric layer 3, a bridge 8 and a lead electrode 7.

In some exemplary embodiments, as shown in FIG. 2A, FIG. 2B, FIG. 4A and FIG. 4B, each bridge 8 includes two connecting portions 82, and a suspension beam portion 81 disposed between the two connecting portions 82 and connected with the connecting portions 82, projections of the ground lines 1 on the substrate 5 are overlapped with projections of the connecting portions 82 on the substrate 5, and a projection of the signal line 2 on the substrate 5 is overlapped with a projection of the suspension beam portion 81 on the substrate 5, the connecting portions 82 are used for supporting the suspension beam portion 81 so that the suspension beam portion 81 is located at a side of the dielectric layer 3 away from the substrate 5.

In some exemplary embodiments, as shown in FIG. 1 and FIG. 3, the number of bridges 8 may be multiple, and the multiple bridges 8 are arranged at an interval along a second direction Y perpendicular to a first direction X, and the first direction X is parallel to a direction in which the ground line 1 points to the signal line 2.

In some exemplary embodiments, the number of bridges is $2^N$, where N is the number of bits of the phase shifter.

The phase shifter shown in FIG. 1 and FIG. 3 includes 32 phase shift units, which may implement a 5-bit digital phase shifter. In some other exemplary embodiments, a 4-bit digital phase shifter may be implemented with 16 phase shift units 4, alternatively, a 6-bit digital phase shifter may be implemented with 64 phase shift units 4. The present disclosure does not limit the number of phase shift units.

In some exemplary implementation, as shown in FIG. 1, FIG. 2A, and FIG. 2B, the dielectric layer 3 includes a first dielectric layer 31, and a second dielectric layer 32 located above the first dielectric layer 31, the signal line 2, and the ground lines 1.

The first dielectric layer 31 is located in a spacing region between the signal line 2 and the ground lines 1, a projection of the first dielectric layer 31 on the substrate 5 is overlapped with the projection of the bridge 8 on the substrate 5.

The second dielectric layer 32 includes two first branches 321, a second branch 322 disposed between the two first branches 321, and multiple third branches 323, wherein there is a spacing between the first branch 321 and the second branch 322, the third branch 323 is disposed in a spacing region between the first branch 321 and the second branch 322, the third branch 323 is connected with the first branch 321 and the second branch 322 respectively. The projection of the ground line 1 on the substrate 5 is located within the projection of the first branch 321 on the substrate 5, the projection of the signal line 2 on the substrate 5 is located within the projection of the second branch 322 on the substrate 5, and the projection of the first dielectric layer 31 on the substrate 5 is overlapped with or at least partially overlapped with the projection of the third branch 323 on the substrate 5.

In this embodiment, the dielectric layer 3 adopts a two-layer design, namely, the first dielectric layer 31 and the second dielectric layer 32, and the spacing between the ground lines 1 and the signal line 2 in a single phase shift unit is filled by the dielectric layer with the two-layer structure, so that the planarization of a sacrificial layer is easier to realize and a bridge with better performance can be obtained. The second dielectric layer 32 mainly provides the following functions. 1. The first portion 32*a* is used for isolating the bridge 8 from the ground line 1. 2. The second portion 32*b* is used for increasing a dielectric constant of the capacitive dielectric layer between the bridge 8 and the signal line 2. 3. The third portion 32*c* is used for enhancing insulation between the ground line 1 and the signal wire 2. 4. The fourth portion 32*d* is used as an adhesive layer to enhance the stability of the suspended structure of the metal bridge. The first dielectric layer 31 is mainly aimed to fill the spacing region between the ground lines 1 and the signal wire 2, reduce a height difference between the structural film layers, facilitate the planarization of the sacrificial layer, and ensure the performance of the bridge.

In some other exemplary implementations, as shown in FIG. 3, FIG. 4A and FIG. 4B, the dielectric layer 3 includes two first branches 321, and a second branch 322 disposed between the two first branches 321, wherein there is a spacing between the first branch 321 and the second branch 322, the projection of the ground line 1 on the substrate 5 is located within the projection of the first branch 321 on the substrate 5, and the projection of the signal line 2 on the substrate is located within the projection of the second branch 322 on the substrate 5.

In the present embodiment, the dielectric layer 3 adopts a single layer design, while the spacing region between the ground line 1 and the signal line 2 is not filled with the dielectric layer.

In some exemplary implementations, as shown in FIG. 1, FIG. 3, FIG. 5A and FIG. 5B, the phase shifter further includes a signal line bias line 62 located at a side of the bridge 8 along the second direction Y or at a side of the phase shifter along the second direction Y, and the signal line 2 is connected with the signal line bias line 62 to provide a second control voltage to the signal line 2 through the signal line bias line 62.

In an exemplary implementation, the phase shifter includes ($2^N$+1) CPW transmission line structures, wherein each of $2^N$ CPW transmission line structures includes one bridge, a ($2^N$+1)-th CPW transmission line structure is disposed at a side of the $2^N$ CPW transmission line structures along the first direction, the ($2^N$+1)-th CPW transmission line structure has no bridge and is configured to be connected with a signal line bias line, where N is the number of bits of the phase shifter.

Figure 5A:
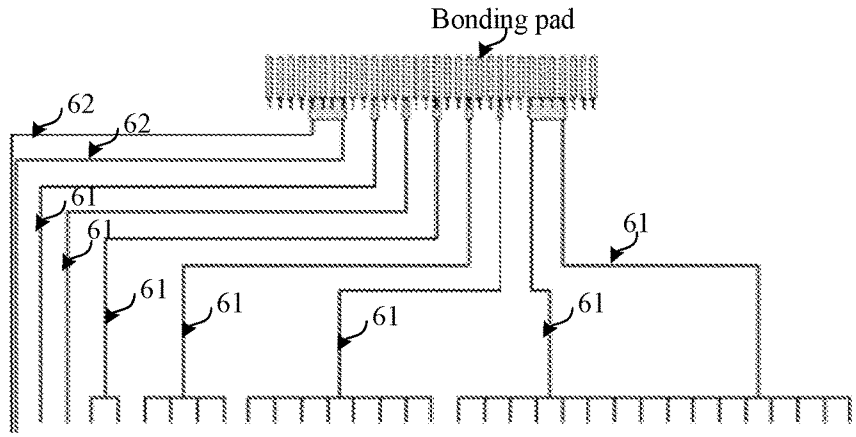
FIG. 5A and FIG. 5B are schematic diagrams of distribution structures of two bias lines according to an embodiment of the present disclosure.
Figure 5B:
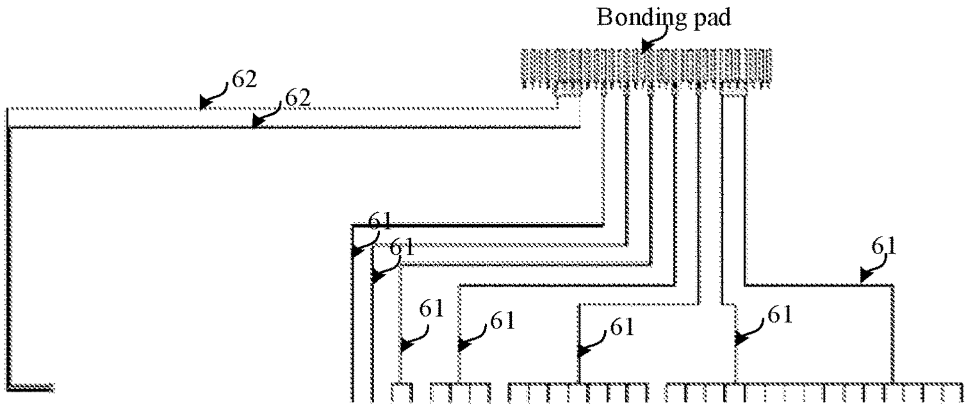

In an embodiment of the present disclosure, as shown in FIG. 1 and FIG. 3, a bridgeless CPW transmission line structure of one unit may be disposed at the left or right side of the 32 phase shift units, and the bridgeless CPW transmission line structure may be used for leading of the signal line bias lines 62. In an exemplary embodiment, as shown in FIG. 5A, two signal line bias lines 62 may be led to enhance reliability. In addition to the signal line bias line structure distribution shown in FIG. 5A, the signal line bias line structure distribution shown in FIG. 5B may also be adopted. In FIG. 5B, the signal line bias line 62 is led from the signal line in the leftmost CPW transmission line of the entire phase shifter.

In some exemplary implementations, as shown in FIG. 2A, FIG. 2B, FIG. 4A and FIG. 4B, the phase shifter further includes a lead electrode 7 and a bridge bias line 61, wherein the bridge 8 is connected with the lead electrode 7, and the lead electrode 7 is connected with the bridge bias line 61 to provide a first control voltage to the bridge 8 through the bridge bias line 61.

In the embodiment of the present disclosure, as shown in FIG. 1 and FIG. 3, the lead electrode 7 is connected with the bridge 8, and the bridge bias line 61 may be led outward from a center position of the lead electrode 7. In the present disclosure, the bridge bias line 61 is led by using the lead electrode 7 since the bridge 8 is usually made of metal aluminum Al, while the bridge bias line is usually made of indium tin oxide (ITO), and the poor contact between ITO and Al causes that peeling occurs easily. Therefore, a better contact can be achieved by adding a layer of transition metal as the lead electrode 7, which is often made of metal copper Cu.

In some exemplary implementations, as shown in FIG. 1 and FIG. 3, the bridge 8 may include multiple bridges, the multiple bridges 8 are divided into multiple groups, each group includes at least one bridge 8, and the at least one bridge 8 of each group is connected by the bridge bias line 61.

In some exemplary implementations, the number of the bridges in i-th group is $2^{N_i}$ where i is an integer between 1 and N+1, $N_i$ is an integer between 0 and N−1, and N is the number of bits of the phase shifter.

In some exemplary implementations, the bridges 8 include six groups of bridges, wherein the first group and the second group each includes one bridge 8, the third group includes two bridges 8, the fourth group includes four bridges 8, the fifth group includes eight bridges 8, and the sixth group includes sixteen bridges 8.

In some exemplary implementations, as shown in FIG. 5A and FIG. 5B, the sixth group of bridges 8 may be connected with two bridge bias lines 61 that are in parallel to enhance reliability.

In the embodiment of the present disclosure, as shown in FIG. 1 and FIG. 3, not each bridge of the 32 phase shift units is controlled individually, instead, one bridge, one bridge, two bridges, four bridges, eight bridges, and sixteen bridges are respectively connected through the bridge bias lines 61, and then is respectively led, and thus there are six bridge bias lines 61 in total. In an exemplary embodiment, a total of seven bridge bias lines 61 may also be led, wherein 16 bridges are led out to two bridge bias lines 61 in order to avoid open circuit due to the too long wiring. A DC voltage is applied between the signal line bias line 62 and the bridge bias line 61. As shown in FIG. 5A and FIG. 5B, finally, all signal line bias lines 62 and bridge bias lines 61 are connected with a bonding pad, two signal line bias lines 62 are connected together, and two bridge bias lines 61 of the 16 bridges are also connected together. Finally, a total of seven control routes are connected with a flexible circuit board (FPC) by bonding, and the control circuit controls the applying of DC control voltage through the FPC.

Figure 6:
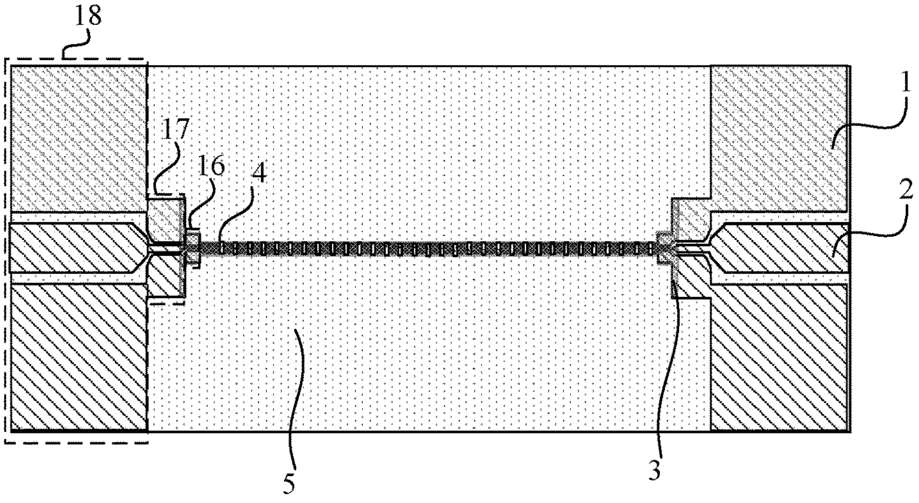
FIG. 6 is a schematic diagram of a test structure of a phase shifter according to an embodiment of the present disclosure.
Figure 7A:
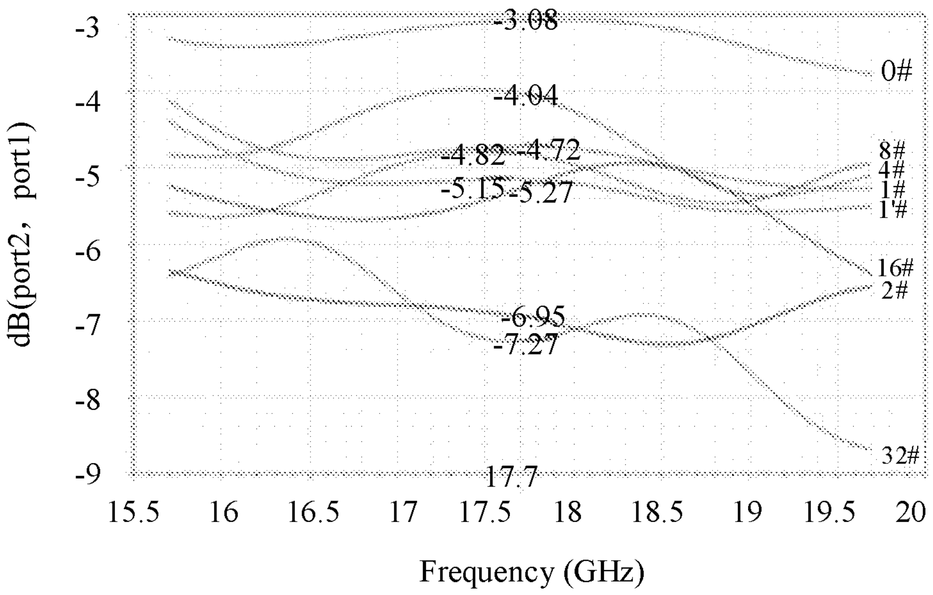
FIG. 7A and FIG. 7B are schematic diagrams of simulation results of the phase shifter in FIG. 6.
Figure 7B:
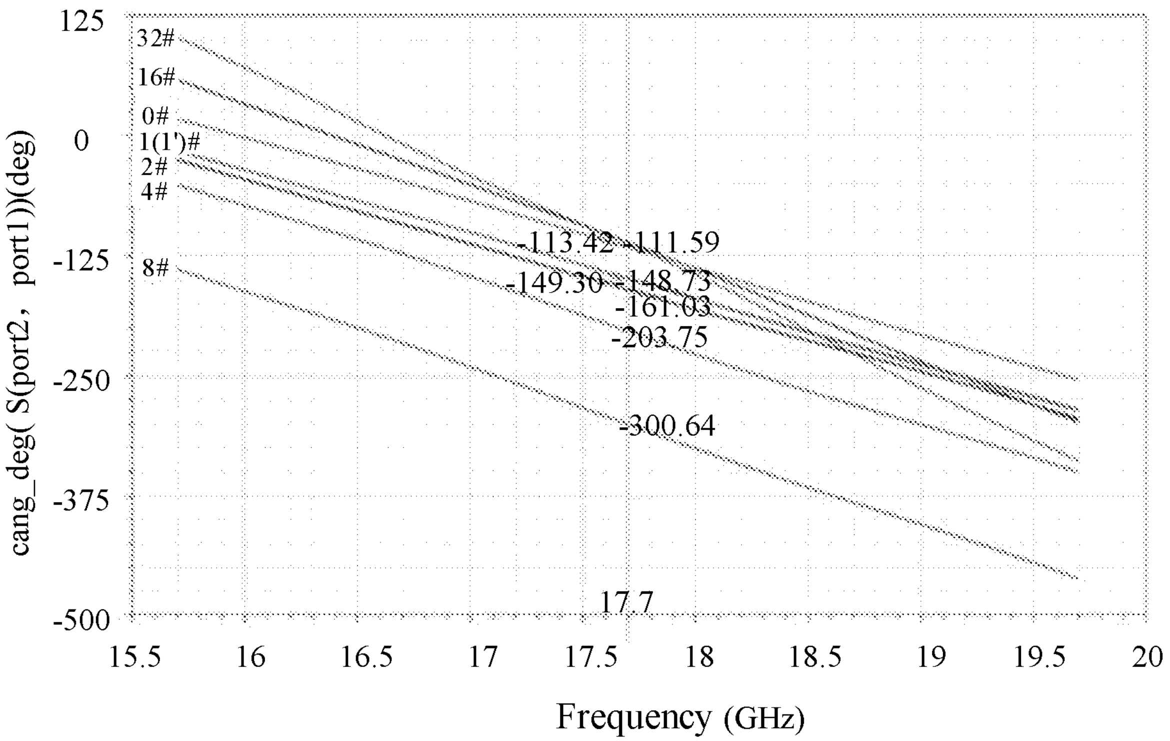

As shown in FIG. 6, first test structures 16, second test structures 17 and third test structures 18, which are all symmetrical, are added at both sides of the 32 phase shift units so as to be connected with an external test port for testing. The first test structure 16 is a CPW transmission line structure of 100Ω, the second test structure 17 is a CPW transmission line structure of 70.7Ω, and the third test structure 18 is a CPW transmission line structure of 50Ω. In an exemplary embodiment, a width of the single bridge 8 is 30 um, a width d1 of the signal line 2 is 20 um, a width d2 of the ground line 1 is 100 um, and the spacing between the signal line 2 and the ground line 1 is 34 um, the scattering parameter (i.e., the S parameter) simulation results are shown in FIG. 7A and FIG. 7B. FIG. 7A corresponds to a size of S21 (i.e., S (port2, port1), port2 and port1 respectively represent the test ports on the left and right sides of the phase shifter) when different numbers of metal bridges are pulled down. Herein 1 #denotes the single bridge of "1" at the leftmost side in "1 1 2 4 8 16" distribution is pulled down, 1'#denotes the single bridge of "1" at the right side in "1 1 2 4 8 16" distribution is pulled down, 2 #denotes the two connected bridges of "2" in "1 1 2 4 8 16" distribution are pulled down, similarly 16 #may be deduced, while 0 #and 32 #respectively denote no bridge is pulled down and all bridges are pulled down. FIG. 7B corresponds to a phase of S21 (cang_deg S21) when different numbers of metal bridges are pulled down.

The simulation results show that when 0, 1, 2, 4, 8, 16 and 32 bridges are pulled down at 17.7 GHz respectively, corresponding phase shift degree varies from 0 to 716.65°, the average bit phase shift degree is 22.4°, and the insertion loss varies from −3.08 to −7.27 dB. Therefore, according to the aforementioned parameter settings of the phase shifter (bridge width of 30 um, CPW transmission line structure of 20 um/34 um/100 um), only 16 units are needed, and the 4-bit digital phase shift function can be realized by using the "1 1 2 4 8" bridge distribution. By reducing the width of the bridge or the width of the signal line in the CPW transmission line, the phase shift of a single phase shift unit is 11.25°, then the 5-bit digital phase shift function can be realized by using 32 phase shift units distributed in "1 1 2 4 8 16" as shown in FIG. 6.

In some exemplary implementations, the width d2 of the ground line 1 along the first direction X is 5 to 6 times the width d1 of the signal line 2 along the first direction X.

Compared with the existing MEMS bridge design, the width of the ground line 1 in the MEMS bridge in the present disclosure is reduced. In an exemplary embodiment, the width d1 of the signal line 2 along the first direction X may be 20 um, the width d2 of the ground line 1 along the first direction X may be 100 um to 200 um, and by way of example, the width d2 of the ground line 1 along the first direction X may be only 100 um, which reduces the size of the phase shift unit and facilitates the array design of the phase shifter in the phased array antenna.

Figure 10:
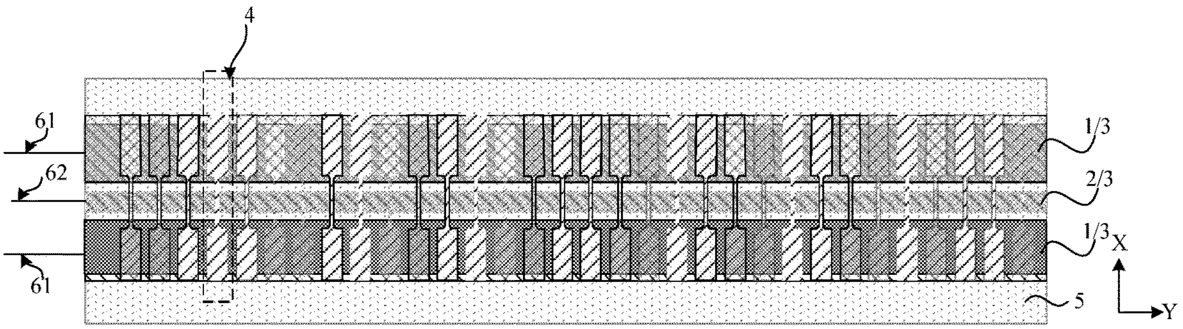
FIG. 10 is a schematic diagram of a structure of yet another phase shifter according to an embodiment of the present disclosure.
Figure 11A:
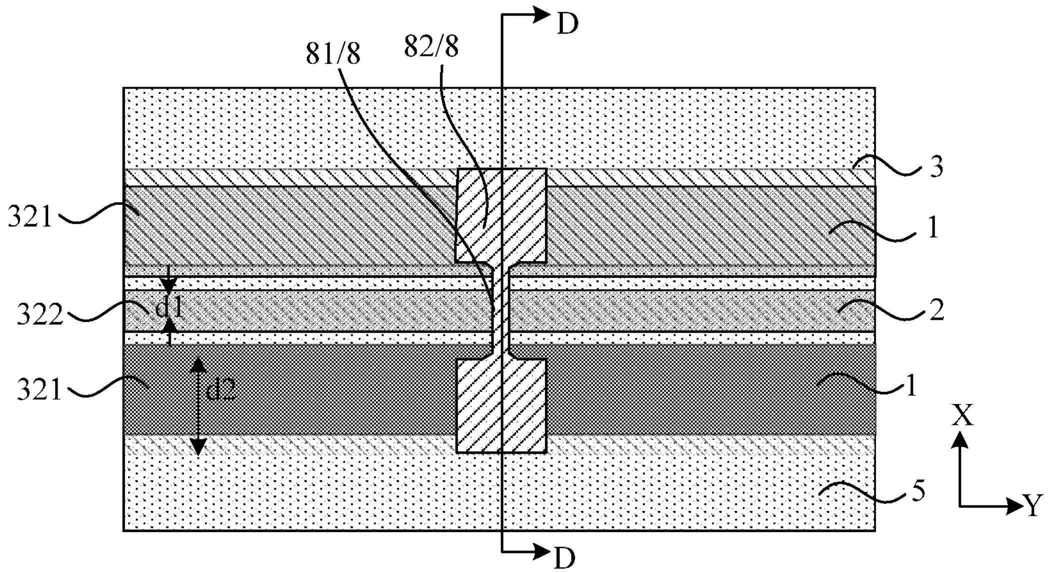
FIG. 11A is a schematic diagram of a structure of the single phase shift unit in FIG. 10.
Figure 11B:
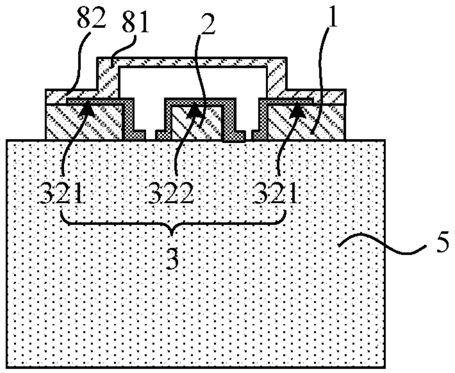
FIG. 11B is a sectional view of the single phase shift unit in FIG. 11A in a D-D direction.

In an embodiment of the present disclosure, in addition to controlling the number of bridges pulled down to realize the digital phase shifter, the DC voltage may also be controlled to realize an analog phase shifter. Corresponding phase shifter structures are shown in FIG. 8, FIG. 9A, FIG. 9B, FIG. 10, FIG. 11A and FIG. 11B, wherein FIG. 9A is a schematic diagram of a structure of the single phase shifter unit in FIG. 8, FIG. 9B is a sectional view of the single phase shifter unit in FIG. 9A in C-C direction, FIG. 11A is a schematic diagram of a structure of the single phase shifter unit in FIG. 10, and FIG. 11B is a sectional view of the single phase shifter unit in FIG. 11A in D-D direction.

Figure 8:
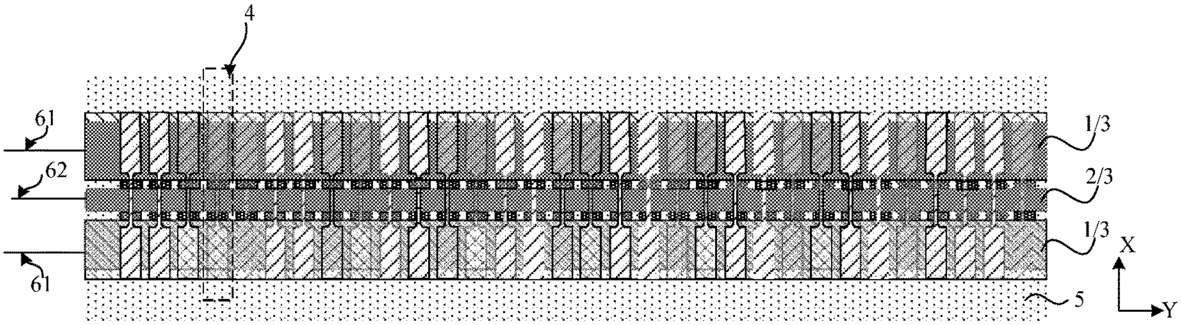
FIG. 8 is a schematic diagram of a structure of yet another phase shifter according to an embodiment of the present disclosure.
Figure 9A:
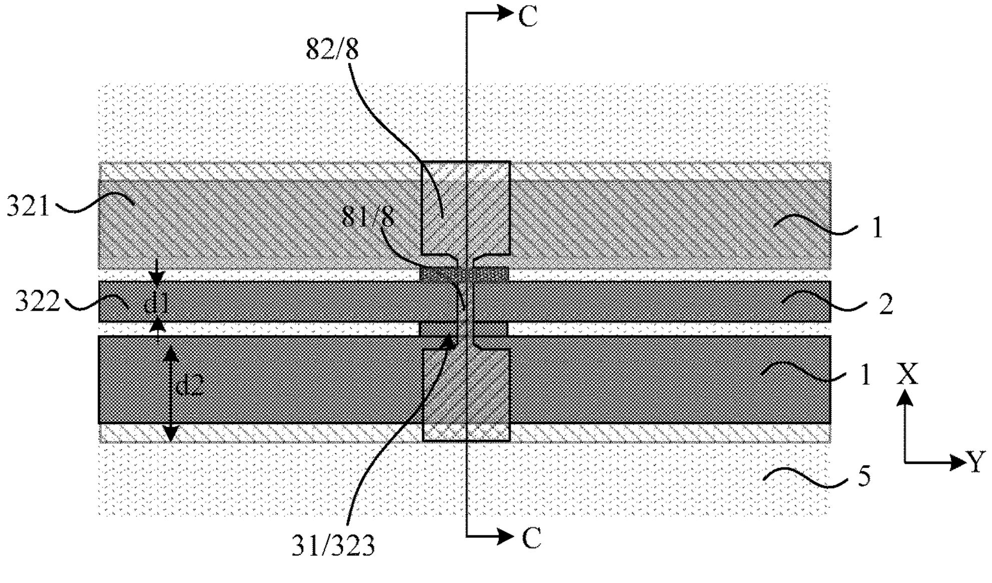
FIG. 9A is a schematic diagram of a structure of the single phase shift unit in FIG. 8.
Figure 9B:
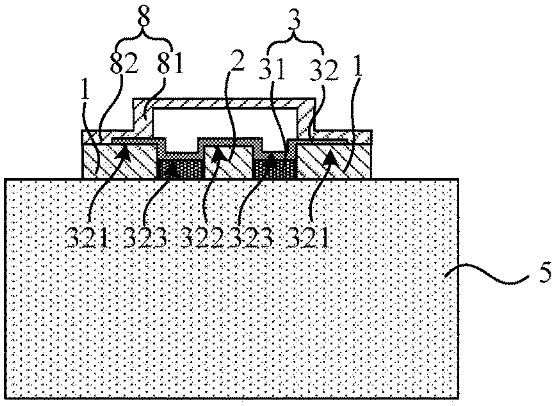
FIG. 9B is a sectional view of the single phase shift unit in FIG. 9A in a C-C direction.

In some exemplary implementation, as shown in FIG. 8, FIG. 9A, and FIG. 9B, the dielectric layer 3 includes a first dielectric layer 31, and a second dielectric layer 32 located above the first dielectric layer 31, the signal line 2, and the ground lines 1.

The first dielectric layer 31 is located in a spacing region between the signal line 2 and the ground lines 1, a projection of the first dielectric layer 31 on the substrate 5 is overlapped with the projection of the bridge 8 on the substrate 5.

The second dielectric layer 32 includes two first branches 321, a second branch 322 disposed between the two first branches 321, and multiple third branches 323, wherein there is a spacing between the first branch 321 and the second branch 322, the third branch 323 is disposed in a spacing region between the first branch 321 and the second branch 322, and the third branch 323 is connected with the first branch 321 and the second branch 322 respectively. Projections of the ground lines 1 on the substrate 5 are partially overlapped with projections of the two first branches 321 on the substrate 5, a projection of the signal line 2 on the substrate 5 is located within a projection of the second branch 322 on the substrate 5, and the projection of the first dielectric layer 31 on the substrate 5 is overlapped with or at least partially overlapped with projections of the third branches 323 on the substrate 5.

In some exemplary implementation, as shown in FIG. 8, FIG. 9A, and FIG. 9B, a projection of a second dielectric layer 32 (first branch 321), located below the connecting portion 82 of the bridge 8, on the substrate 5 and the projection of the ground line 1 on the substrate 5 have a non-overlapped region.

The bridge 8 is connected with the ground line 1 in the non-overlapped region to provide a first control voltage to the bridge 8 through the ground line 1.

In some other exemplary implementations, as shown in FIG. 10, FIG. 11A and FIG. 11B, the dielectric layer 3 includes two first branches 321, and a second branch 322 disposed between the two first branches 321. There is a spacing between the first branch 321 and the second branch 322, wherein projections of the ground lines 1 on the substrate 5 is partially overlapped with projections of the two first branches 321 on the substrate 5, and a projection of the signal line 2 on the substrate is located within a projection of the second branch 322 on the substrate 5.

In some exemplary implementation, as shown in FIG. 10, FIG. 11A, and FIG. 11B, the projection of the dielectric layer 3 (first branch 321), located below the connecting portion 82 of the bridge 8, on the substrate 5 and the projection of the ground line 1 on the substrate 5 have a non-overlapped region.

The bridge 8 is connected with the ground line 1 in the non-overlapped region to provide a first control voltage to the bridge 8 through the ground line 1.

In the analog phase shifter according to an embodiment of the present disclosure, the bridge 8 is directly connected with the ground line 1 in the CPW transmission line, and a DC voltage is applied between the signal line 2 and the ground line 1 of the CPW transmission line, but a side of the ground line 1 close to the signal line 2 is partially surrounded by an insulating dielectric layer, which can enhance the adhesion between the bridge 8 and the CPW transmission line, and achieve better insulation effect between the signal line 2 and the ground line 1. Similarly, in the analog phase shifter, the dielectric layer 3 may also adopt a two-layer design to achieve better planarization of sacrificial layer and better performance of the bridge. After a given voltage is provided, all bridges move at the same time and the pull-down heights of all bridges are the same. The pull-down height is controlled by controlling the voltage, different pull-down heights correspond to different sizes of capacitance and different sizes of phase shift. The analog phase shifter according to an embodiment of the present disclosure can selectively use 16 or 32 phase shift units to realize continuous phase shift from 0 to 360°.

Figure 12:
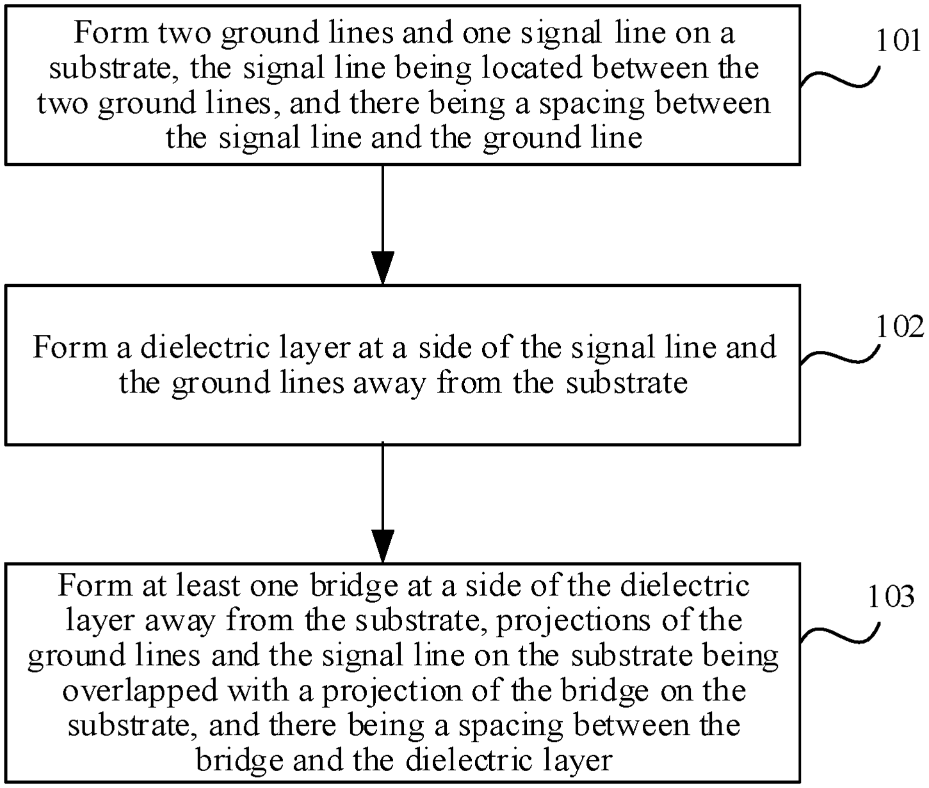
FIG. 12 is a schematic flowchart of a preparation method of a phase shifter according to an embodiment of the present disclosure.

As shown in FIG. 12, an embodiment of the present disclosure also provides a preparation method of a phase shifter to prepare the phase shifter in the preceding embodiments. The preparation method includes the following acts.

In act 101, two ground lines and one signal line are formed on a substrate, wherein the signal line is located between the two ground lines and there is a spacing between the signal line and any one of the ground lines.

Optionally, prior to the act 101, the preparation method may further include: forming a bias line layer on the substrate, wherein the bias line layer is used to provide a control voltage for a signal line and a bridge.

In the phase shifter according to the embodiment of the present disclosure, all the bias lines are located on the most lowest layer, so that the risk of short circuit caused by creeping wave and other factors can be avoided.

Optionally, after the bias line layer is formed, the preparation method may further include: forming a first dielectric layer on the bias line layer.

Optionally, a metal layer may be formed on the substrate, and the metal layer may be patterned to simultaneously form ground lines and a signal line, the two ground lines and the signal line are arranged interleavedly on the substrate, the signal line is located between the two ground lines, to form a coplanar waveguide transmission line (CPW).

In act 102, a dielectric layer is formed at a side of the signal line and the ground lines away from the substrate.

Optionally, the dielectric layer may completely cover the exposed surfaces of the signal line and the ground lines.

Optionally, the dielectric layer may be an insulating dielectric layer.

In act 103, at least one bridge is formed at a side of the dielectric layer away from the substrate, wherein projections of the ground lines and the signal line on the substrate are overlapped with a projection of the bridge on the substrate, and there is a spacing between the bridge and the dielectric layer.

Optionally, the act 103 may include the following S1031-S1033.

In S1031, a sacrificial layer is formed at a side of the dielectric layer away from the substrate, wherein a position of the sacrificial layer corresponds to a position of a suspension beam portion formed later.

In S1032, a bridge is formed at a side of the sacrificial layer away from the substrate, wherein the bridge includes two connecting portions, and a suspension beam portion disposed between the two connecting portions and connected with the connecting portions, and the connecting portions are connected with a lead electrode or the ground line.

In S1033, the sacrificial layer is removed.

The phase shifter according to the embodiment of the present disclosure can realize a 4-bit/5-bit digital phase shifter, or can realize analog continuous phase shift. The phase shifter can be used in a phased array antenna to realize satellite communication function.

An embodiment of the present disclosure also provides a phased array antenna, which includes the phase shifter described in any of the foregoing embodiments.

Although the implementations disclosed in the present disclosure are described as above, the described contents are only implementations which are used for facilitating the understanding of the present disclosure, and are not intended to limit the present invention. Any skilled person in the art to which the present disclosure pertains may make any modifications and variations in forms and details of implementations without departing from the spirit and scope of the present disclosure. However, the patent protection scope of the present invention should be subject to the scope defined by the appended claims.

The invention claimed is:

1. A phase shifter, comprising:

a substrate;

two ground lines, located on the substrate;

a signal line, located on the substrate and between the two ground lines, wherein there is a spacing between the signal line and any one of the two ground lines;

a dielectric layer, located at a side of the signal line and the two ground lines, away from the substrate;

at least one bridge, located at a side of the dielectric layer away from the substrate, wherein projections of the two ground lines and the signal line on the substrate are overlapped with a projection of the at least one bridge on the substrate, and there is a spacing between the at least one bridge and the dielectric layer;

wherein a number of the at least one bridge is a plurality, and the plurality of bridges are arranged at an interval along a second direction perpendicular to a first direction, and the first direction is parallel to a direction in which the two ground lines points to the signal line;

wherein the phase shifter comprises ($2^N$+1) coplanar waveguide (CPW) transmission line structures, wherein each of $2^N$ CPW transmission line structures comprises one bridge of the plurality of bridges, a ($2^N$+1)-th CPW transmission line structure is arranged at a side of the $2^N$ CPW transmission line structures along the first direction, the ($2^N$+1)-th CPW transmission line structure has no bridge and is configured to be connected with a signal line bias line, where N is a number of bits of the phase shifter.

2. The phase shifter according to claim 1, wherein the dielectric layer comprises a first dielectric layer, and a second dielectric layer located above the first dielectric layer, the signal line, and the two ground lines;

the first dielectric layer is located in a spacing region between the signal line and the two ground lines, and a projection of the first dielectric layer on the substrate is overlapped with the projection of the at least one bridge on the substrate;

the second dielectric layer comprises two first branches, a second branch disposed between the two first branches, and a plurality of third branches, wherein there is a spacing between any one of the two first branches and the second branch, the third branch is disposed between the two first branches and the second branch, the third branch is connected with the two first branches and the second branch respectively, projections of the two first branches on the substrate are at least partially overlapped with projections of the two ground lines on the substrate, a projection of the signal line on the substrate is located within a projection of the second branch on the substrate, and the projection of the first dielectric layer on the substrate is at least partially overlapped with projections of the third branches on the substrate.

3. The phase shifter according to claim 2, wherein the projections of the two ground lines on the substrate are located within the projections of the two first branches on the substrate;

the phase shifter further comprises a lead electrode and a bridge bias line, wherein the lead electrode is connected with the plurality of bridges, and the lead electrode is connected with the bridge bias line to provide a first control voltage to the plurality of bridges through the bridge bias line.

4. The phase shifter according to claim 3, wherein the plurality of the bridges are divided into a plurality of groups, each of the plurality of groups comprises the at least one bridge, and the at least one bridge of each group is connected by the bridge bias line.

5. The phase shifter according to claim 4, wherein a number of bridges of an i-th group is $2^{N_i}$, where i is an integer between 1 and N+1, $N_i$ is an integer between 0 and N−1, N is the number of bits of the phase shifter.

6. The phase shifter according to claim 2, wherein a projection of the two first branches below the plurality of bridges on the substrate and a projection of the two ground lines on the substrate have a non-overlapped region; and the plurality of bridges are connected with the two ground lines in the non-overlapped region to provide a first control voltage to the plurality of bridges through the two ground lines.

7. The phase shifter according to claim 1, wherein the dielectric layer comprises two first branches, and a second branch disposed between the two first branches, wherein there is a spacing between any one of the two first branches and the second branch, projections of the two first branches on the substrate and projections of the two ground lines on the substrate have an overlapped region, and a projection of the signal line on the substrate is located within a projection of the second branch on the substrate.

8. The phase shifter according to claim 7, wherein the projections of the two ground lines on the substrate are located within the projections of the two first branches on the substrate;

the phase shifter further comprises a lead electrode and a bridge bias line, wherein the plurality of bridges are connected with the lead electrode, and the lead electrode is connected with the bridge bias line to provide a first control voltage to the plurality of bridges through the bridge bias line.

9. The phase shifter according to claim 7, wherein a projection of the two first branches below the plurality of bridges on the substrate and a projection of the two ground lines on the substrate have a non-overlapped region; and the plurality of bridges are connected with the two ground lines in the non-overlapped region to provide a first control voltage to the plurality of bridges through the two ground lines.

10. The phase shifter according to claim 1, wherein each of the plurality of bridges comprises two connecting portions, and a suspension beam portion disposed between the two connecting portions and connected with the two connecting portions, projections of the two ground lines on the substrate are overlapped with projections of the connecting portions on the substrate, a projection of the signal line on the substrate is overlapped with a projection of the suspension beam portion on the substrate, the connecting portions are used for supporting the suspension beam portion, to make the suspension beam portion be located at a side of the dielectric layer away from the substrate.

11. The phase shifter according to claim 1, wherein the number of the plurality of bridges is $2^N$, where N is the number of bits of the phase shifter.

12. The phase shifter according to claim 1, wherein a width of the two ground lines along the first direction is 5 to 6 times a width of the signal line along the first direction.

13. The phase shifter according to claim 1, further comprising a signal line bias line located at a side of the plurality of bridges along a second direction or at a side of the phase shifter along a second direction, and the signal line is connected with the signal line bias line to provide a second control voltage to the signal line through the signal line bias line.

14. A phased array antenna, comprising the phase shifter according to claim 1.

15. A preparation method of a phase shifter, comprising:

forming two ground lines and one signal line on a substrate, wherein the signal line is located between the two ground lines, and there is a spacing between the signal line and any one of the two ground lines;

forming a dielectric layer at a side of the signal line and the two ground lines, away from the substrate;

forming at least one bridge at a side of the dielectric layer away from the substrate, wherein projections of the two ground lines and the signal line on the substrate are overlapped with a projection of the at least one bridge on the substrate, and there is a spacing between the at least one bridge and the dielectric layer;

wherein a number of the at least one bridge is a plurality, and the plurality of bridges are arranged at an interval along a second direction perpendicular to a first direction, and the first direction is parallel to a direction in which the two ground lines points to the signal line;

wherein the phase shifter comprises ($2^N$+1) coplanar waveguide (CPW) transmission line structures, wherein each of $2^N$ CPW transmission line structures comprises one bridge of the plurality of bridges, a ($2^N$+1)-th CPW transmission line structure is arranged at a side of the $2^N$ CPW transmission line structures along the first direction, the ($2^N$+1)-th CPW transmission line structure has no bridge and is configured to be connected with a signal line bias line, where N is a number of bits of the phase shifter.

* * * * *